(12) United States Patent
Drake

(10) Patent No.: US 9,333,688 B2
(45) Date of Patent: May 10, 2016

(54) DECORATED THERMOPLASTIC FILM AND METHODS FOR MAKING THE SAME

(76) Inventor: Jonathan Drake, Monterey, CA (US)

( * ) Notice: Subject to any disclaimer, the term of this patent is extended or adjusted under 35 U.S.C. 154(b) by 123 days.

(21) Appl. No.: 14/005,332

(22) PCT Filed: Mar. 8, 2012

(86) PCT No.: PCT/US2012/028244
§ 371 (c)(1),
(2), (4) Date: Jan. 6, 2014

(87) PCT Pub. No.: WO2012/122360
PCT Pub. Date: Sep. 13, 2012

(65) Prior Publication Data
US 2014/0193617 A1 Jul. 10, 2014

Related U.S. Application Data

(60) Provisional application No. 61/450,312, filed on Mar. 8, 2011.

(51) Int. Cl.
*B41M 5/50* (2006.01)
*B29C 45/14* (2006.01)
*B32B 27/08* (2006.01)

(52) U.S. Cl.
CPC ..... *B29C 45/14688* (2013.01); *B29C 45/14811* (2013.01); *B32B 27/08* (2013.01); *B41M 5/504* (2013.01); *B29C 45/1418* (2013.01); *B29C 2045/14721* (2013.01); *B29C 2045/14729* (2013.01); *B29C 2045/14737* (2013.01); *B41M 2205/02* (2013.01); *Y10T 428/24802* (2015.01); *Y10T 428/24868* (2015.01)

(58) Field of Classification Search
CPC .... B41M 5/50; B41M 5/504; B41M 2205/02; B29C 45/14; B29C 45/14688; B29C 45/14811; B29C 2045/14721; B29C 2045/14729; Y10T 428/24802; Y10T 428/24868
USPC ................. 503/227; 428/195.1, 203; 264/132
See application file for complete search history.

(56) References Cited

U.S. PATENT DOCUMENTS

| 4,917,927 A | 4/1990 | Sakaitani et al. |
| 6,623,677 B1 * | 9/2003 | Smith et al. .................. 264/132 |
| 2003/0041962 A1 | 3/2003 | Johnson et al. |
| 2006/0019099 A1 | 1/2006 | Wang et al. |
| 2006/0188595 A1 | 8/2006 | Furukawa et al. |

FOREIGN PATENT DOCUMENTS

| EP | 1495862 | 1/2005 |
| EP | 1593488 | 11/2005 |
| WO | WO-03/106134 | 12/2003 |

OTHER PUBLICATIONS

Braun, H. et al., "Vom Serienprodukt zum Unikat", Plastverarbetier, Huethig GmbH; Heidelberg, Germany, vol. 56, No. 10, Oct. 1, 2005, pp. 132-133.

* cited by examiner

*Primary Examiner* — Bruce H Hess
(74) *Attorney, Agent, or Firm* — Perkins Coie LLP

(57) ABSTRACT

The present invention is directed to variably decorative thermoplastic films having a graphic design saturated into a laminate or coated substrate, which can be pre-formed using heat and pressure and then placed in injection molds for product molding without impacting the quality of the graphics.

20 Claims, No Drawings

DECORATED THERMOPLASTIC FILM AND METHODS FOR MAKING THE SAME

This application is a 371 National Filing of International Patent Application No. PCT/US2012/028244, filed Mar. 8, 2012, which claims priority to U.S. Provisional Application No. 61/450,312, filed Mar. 8, 2011, the contents of which are hereby incorporated by reference in their entireties.

FIELD OF THE INVENTION

The invention pertains to rendering dispersion dye graphics into the surface of film constructions which are then used with in-mold decoration operations during injection molding. More specifically, the invention pertains to substantially clear dye-receptive films laminated over opaque substrates, or coated substrates, to achieve film constructions that are ideal for supporting dye-rendered graphics. After printing, the films can be pre-formed using heat and pressure and then placed in injection molds for product molding with decorated surfaces without impacting the quality of the graphics.

BACKGROUND OF THE INVENTION

Decorative thermoplastics have been widely used as protective coverings from flooring to electronics. Thermoplastics can be melted and molded, making them suitable for virtually any application where a protective covering is desired.

There are various processes commonly used to inlay a decoration onto thermoplastics. These processes, such as in-mold labeling (IML), film insert molding (FIM) and in-mold decoration (IMD), involve printing a film with a decorative graphic; inserting the film into the injection mold; and injecting a thermoplastic molding compound behind the film. When the film is removed from the injection mold, the printed film has theoretically adhered to the molding compound and acts as the decorative first surface. The printing process itself typically involves methods such as silk-screening, rotary screening, flexographic printing techniques and offset lithography printing, among others.

In practice, the combination of the printing processes and inlay processes described above can result in a graphic that is not durable and can be easily damaged, abraded or chemically removed from the printed surface of the finished film. In order to avoid such potential damage, standard practice has been to print the backside of a transparent film, and then place the film in the mold with the graphic facing the inside of the mold. Molding compound is then shot against the graphically printed and coated surface. This yields a graphic that is protected by a layer of transparent plastic film on the first surface.

However, printed graphics cannot easily survive the conditions inside the injection mold, which can be up to 12,000 psi and 600 f. Graphics are burned and sheared off the surface of the films that are facing the inside of the mold, when the hot resins flow in through the injection gates. Methods have been developed for specialized gating that will allow specific areas within the mold to support film insert molding without destroying the graphics, as long as specialized and specific processing parameters are maintained.

Another attempt to address the problem of graphic survival inside the mold is to coat the graphic with a high temperature coating that will protect the graphic from the hot molding compounds that are injected into the mold and onto the graphically printed surface that has been coated. However, the coatings used to protect the graphics cannot create a miscible bond with the hot flowing molding compounds made up of thermoplastic resins. In fact these protective coatings generally interfere with and defeat a quality lamination bond between the decorated films and the hot molding compounds. Therefore, specialized adhesion promoters have been developed that will help to improve the bond between the protective coatings on the in-mold decorative films and the hot flowing resins. A series of adhesion promoters have been developed specific to each of the thermoplastic resins and protective coatings used in molding the product. However, delamination between the decorative film and the molded parts remains a challenge.

A further obstacle for printed thermoplastics is that the printed and coated films are often thermoformed to conform to the shape of the mold before they are inserted into the injection mold. Therefore the film printing must also be able to survive the heating and stretching of the film over profiles and complex curves during the thermoforming process. Inks that can go through a vacuum forming process, "Formable inks", have been developed. However, because these formable ink systems are pigment-based inks and printed to the surface of the films, they can only withstand film stretching of less than half inch before the graphic print thins and degrades. This failure severely limits the scope of form factors that can be decorated using the traditional in-mold decoration methods in practice today.

There exists a need in the art for a variably decorated thermoplastic film which retains its graphic throughout the molding process, as well as throughout the use of the film to which it is applied.

SUMMARY OF THE INVENTION

It is therefore an object of the invention to provide a variably decorated thermoplastic film having a durable imprinted graphic and methods of making the same.

In certain embodiments, the present invention is directed to a decorated thermoplastic film comprising: (i) a substrate having a first surface and a second surface located opposite the first surface, the first surface having a graphic saturated into the substrate; and (ii) a thermoplastic composition in contact with the second surface of the substrate, wherein the thermoplastic composition does not contact the first surface of the substrate.

In certain embodiments, the present invention is directed to a decorated thermoplastic film comprising: (i) a coated substrate having a first surface and a second surface located opposite of the first surface, the first surface having a graphic saturated into the substrate; and (ii) a thermoplastic composition in contact with the second surface of the coated substrate, wherein the thermoplastic composition does not contact the first surface of the coated substrate.

In certain embodiments, the present invention is directed to a decorated thermoplastic film comprising: (i) a laminate substrate having a first surface and a second surface located opposite of the first surface, the first surface having a graphic saturated into the substrate; and (ii) a thermoplastic composition in contact with the second surface of the laminate substrate, wherein the thermoplastic composition does not contact the first surface of the laminate substrate.

In certain embodiments, the present invention is directed to a decorated thermoplastic film comprising: (i) a substrate comprising from about 5% to about 25% common-light wavelength light transmission, the substrate having a first surface and a second surface located opposite of the first surface, the first surface having a graphic saturated into the substrate; and (ii) a thermoplastic composition in contact with the second surface of the substrate, wherein the thermoplastic composition does not contact the first surface of the substrate.

In certain embodiments, the present invention is directed to a method for making a decorated thermoplastic film comprising: (i) rendering a graphic into a substrate having a first surface and a second surface located opposite of the first surface, wherein the graphic is rendered into the first surface of the substrate; (ii) placing the substrate in a mold, wherein the first surface of the substrate is positioned to be in contact with the mold; and (iii) injecting a thermoplastic composition into the mold onto the second surface of the substrate.

In certain embodiments, the present invention is directed to a method for making a decorated thermoplastic film comprising: (i) rendering a graphic into a laminate substrate having a first surface and a second surface located opposite of the first surface, wherein the graphic is rendered into the first surface of the laminate substrate; (ii) placing the laminate substrate in a mold, wherein the first surface of the laminate substrate is positioned to be in contact with the mold; and (iii) injecting a thermoplastic composition into the mold onto the second surface of the laminate substrate.

In certain embodiments, the present invention is directed to a method for making a decorated film comprising: (i) rendering a graphic into a coated substrate comprising a first surface and a second surface located opposite of the first surface, wherein the graphic is rendered into the first surface of the coated substrate; (ii) placing the coated substrate in a mold, wherein the first surface of the coated substrate is positioned to be in contact with the mold; and (iii) injecting a thermoplastic composition into the mold onto the second surface of the coated substrate.

In certain embodiments, the present invention is directed to a method for making a decorated thermoplastic film comprising: (i) rendering a graphic into a substrate comprising from about 5% to about 25% common-light wavelength light transmission, the substrate having a first surface and a second surface located opposite of the first surface, wherein the graphic is rendered into the first surface of the coated substrate; (ii) placing the substrate in a mold, wherein the first surface of the substrate is positioned to be in contact with the mold; and (iii) injecting a thermoplastic composition into the mold onto the second surface of the substrate.

In describing the present invention, the following terms are to be used as indicated below. As used herein, the singular forms "a," "an," and "the" include plural references unless the context clearly indicates otherwise.

As used herein, the term "durable" means resistant to normal wear and tear, scratches, removal, color fading, etc.

As used herein, the terms "ink", "dye" and "dye-ink" are used interchangeably.

As used herein, the terms "rendered" or "rendering" and "saturated" or "saturating", respectively, are used interchangeably.

DETAILED DESCRIPTION

The present invention provides a method for making a decorated thermoplastic film through the process of injection molding using a decorated film inserted into the mold. The graphic is printed into first surface (facing the eye) of the film insert. The method produces films that will present bright, full color, photo quality graphics unmuted by layers of protective plastics, yet the graphic can meet durability requirements for OEM manufacturing of consumer products.

One of the benefits of the present invention is that the resulting decorated thermoplastic films will not lose their color and brightness over time, the graphic cannot be scratched off the surface, and the decorative thermoplastics can be produced using any printing method suitable for injection molding processes, such as, e.g., digital and analog printing methods.

The films of the present invention are particularly suitable when a design having a high resolution is required, as the films of the present invention maintain the high resolution of their graphics imprinted in them.

An additional benefit of the present invention is that the film inserts do not require protective back-coatings over the graphics in order to support survival of the graphics during the molding process. The unprinted side (second surface) of the film substrate, onto which the hot flowing resins are injected, protects the first surface graphic during injection molding. As the unprinted side is the only side in contact with the thermoplastic resin, the printed side does not require a protective coating. Therefore, the process of the present invention does not create bonding issues between the decorated films and the molding compounds, as the molding compounds are shot onto naked, unprinted film surfaces. The present invention allows the selection of films and resins from compatible categories of thermoplastic materials commonly used in injection molding. Then, after printing the films, combining these materials under the conditions prevailing in the common injection molding process produces an inviolable miscible and/or adhesive bond between the decorated films inserted into the molds and the molding compounds shot in behind them.

In certain embodiments, the substrate used for the films comprises a thermoplastic resin suitable for injection molding, such as, e.g., polycarbonate homopolymers, copolycarbonates, acrylonitrile-butadiene-styrene resins (ABS), styrene/acrylonitrile (SAN), polyamides, thermoplastic polyurethane, polymethylmethacrylate (PMMA Acrylics), thermoplastic urethane (TPU), Thermoplastic Elastomer (TPE), polyvinyl fluoride (PVF), poly vinylidine fluoride (PVDF), blends of polycarbonate, resins thereof, or mixtures thereof. In preferred embodiments, the laminate substrate comprises a polycarbonate resin.

In certain embodiments, the substrate used for the films comprises multiple film layers, which can include, e.g., transparent layers, opaque layers, or a combination thereof.

In other embodiments, the substrate comprises a single film layer, preferably an opaque layer.

In preferred embodiments of the present invention, the films used are preferably clear or substantially clear, dye-receptive films laminated over opaque, or substantially opaque, substrates. In such embodiments the substrate is preferably white.

The opacity of a white film can be reduced to a pigment to polymer ratio that allows the dye images to be successfully rendered directly into the white films. No clear layer, to support dye graphics, becomes necessary. Preferably, the opacity is suitable to render dye images on a thermoplastic film, and preferably provides about a minimum of 5%, 8%, 10% or 15% light transmission. In some embodiments, a film comprising titanium dioxide and a polycarbonate can be used to create the appropriate level of light transmission suitable for the dye images.

In order to achieve the desired opacity of the film, the ratio of polymer to pigment will vary depending on the thickness of the film gauge. For example, a thinner gauge film will require more pigment, while a film with a thicker gauge will require less pigment to achieve the desired opacity. Thus, the polymer:pigment ratio can be e.g., from 1:20 to 20:1, 1:15 to 15:1; 1:10 to 10:1, 1:5 to 5:1, depending on the film gauge.

In certain embodiments of the present invention, the substrate can be coated with a material suitable for use in injection molding. For example, coatings such as water-based, solvent-based or UV cured coatings, can be placed over opaque, or substantially opaque, substrates. In such embodiments, any type of coating known in the art that can be applied to injection mold films to achieve hardness and chemical resistance can be used.

In preferred embodiments, the coatings are placed over the substrate at about 0.001" in thickness, or less than about 0.001" in thickness.

The graphic is created using dye systems that saturate color into the films rather than traditional surface printed, pigment-based, high temperature ink systems. As the ink is saturated into the film as opposed to resting on the surface, the decorated films produced by this invention can be easily thermoformed to conform to the mold in which they will be inserted, without damaging the graphic. The dye images are intimate with the polymer structure of the films and therefore flow with the resins when formed rather than stretching and degrading like surface printed films. Films produced using the present invention, can be thermoformed over complex curves and deep draws (inches), before insertion in the injection mold, without loss of color or distortion of the graphic. No changes in gate design or molding technique are required to achieve a final decorated product using the methods of the present invention.

In the saturation process, the ink is saturated into the films to a depth of from about 0.0001" to about 0.01", and preferably to a depth of about 0.004". Preferably, the ink is saturated into the film by sublimation.

In embodiments wherein the substrate comprises both a transparent and an opaque layer, the graphic is preferably printed into the transparent layer.

After the graphic is printed into the film, the film can be pre-formed using heat and pressure and then placed in injection molds for product molding and thereby producing decorated surfaces without impacting the quality of the graphics. The thermoplastic composition which is shot into the injection molds forms a miscible and/or adhesive bond with the surface of the substrate not directly touching the inside of the mold.

The decorated thermoplastic films of the present invention can be applied to any article made by injection molding, such as, e.g., wireless device covers (cell phone covers, etc.), computer cases, car interiors (dashboards, trim, etc.), plastic serverware (bowls, utensils, etc.), and the like.

The following examples are set forth to assist in understanding the invention and should not be construed as specifically limiting the invention described and claimed herein. Such variations of the invention, including the substitution of all equivalents now known or later developed, which would be within the purview of those skilled in the art, and changes in formulation or minor changes in experimental graphic, are to be considered to fall within the scope of the invention incorporated herein.

EXAMPLES

Example 1

A decorated thermoplastic film was made by:
(i) rendering a dye-based ink graphic on a surface of transfer paper;
(ii) transferring the graphic by dye dispersion into a laminate substrate;
(iii) placing the decorated substrate in a mold, with the graphic being in contact with the inside wall of the mold; and
(iv) injecting a thermoplastic composition into the mold.

Example 2

A decorated thermoplastic film was made by:
(i) printing a dye-based ink a graphic on a surface of transfer paper;
(ii) transferring the graphic by dye dispersion into the top layer of a laminate substrate made of thermoplastic resins;
(iii) forming the decorated substrate to attain a three-dimensional decorated substrate;
(iv) placing the decorated substrate in a mold, with the top layer of the laminate substrate with the graphic in contact with the inside wall of the mold; and
(v) injecting a thermoplastic composition into the mold.

Example 3

A decorated thermoplastic film was made by:
(i) printing a dye-based inkjet ink a graphic on a surface of transfer paper;
(ii) transferring the graphic by sublimation into the surface of a multiple laminate substrate comprising a substantially opaque layer and a substantially transparent layer, where the graphic was transferred into the substantially transparent layer;
(iii) placing the decorated substrate in a mold, with the graphic surface layer in contact with the inside wall of the mold; and
(iv) injecting a thermoplastic composition into the mold.

Example 4

A decorated thermoplastic film was made by:
(i) printing a dye-based inkjet ink a graphic on a surface of transfer paper;
(ii) transferring the graphic by sublimation into the surface of a multiple laminate substrate comprising a layer of substantially opaque polycarbonate homopolymer and a layer of transparent film, the multi-ply made up of one ply of opaque polycarbonate homopolymer, and one ply of transparent polymer, where the graphic was transferred into the transparent layer;
(iii) placing the decorated substrate in a mold, with the decorated surface of the substrate in contact with the inside wall of the mold; and
(iv) injecting a thermoplastic composition into the mold to form an film such that a strong miscible bond developed between the opaque undecorated second surface of the decorated substrate and the thermoplastic composition.

Example 5

A decorated thermoplastic film was made by:
(i) printing a dye-based inkjet ink graphic on a surface of transfer paper;
(ii) transferring the graphic by sublimation into the first surface of a multiple laminate substrate, wherein the first surface comprised a layer of polyvinyl fluoride (PVF) and a polycarbonate;
(iii) placing the decorated substrate in a mold, with the decorated first surface of the substrate in contact with the inside wall of the mold; and
(iv) injecting a thermoplastic composition into the mold to form an film such that a strong miscible bond developed between the opaque undecorated second surface of the decorated substrate and the thermoplastic composition.

Example 6

A decorated thermoplastic film was made by:
(i) printing a dye-based inkjet ink graphic on a surface of transfer paper;
(ii) transferring the graphic by dye dispersion into a surface of a transparent film;
(iii) laminating the printed transparent film to another piece of substantially opaque white film, with the printed surface in contact with the film in lamination; wherein a miscible bond formed between the transparent printed surface and the white multiply film laminate.
(v) placing the decorated multi-ply laminate in a mold with the transparent film touching the inside wall of the mold and the white film facing the mold cavity; and
(vi) injecting a thermoplastic composition into the mold to form an film such that a strong miscible bond developed between the opaque undecorated second surface of the decorated substrate and the thermoplastic composition.

Example 7

Prophetic

A decorated thermoplastic film can be made by:
(i) printing a dye-based ink a graphic directly into the surface of the substrate;
(ii) placing the decorated substrate in a mold, with the top layer of the laminate substrate with the graphic in contact with the inside wall of the mold; and
(iii) curing the film using heat and pressure.

What is claimed:

1. A decorated thermoplastic film comprising:
(i) a substrate having a first surface and a second surface located opposite the first surface,
    wherein the substrate has a dye-based graphic saturated into the first surface; and
(ii) a thermoplastic composition in contact with the second surface of the substrate,
    wherein the second surface of the substrate maintains separation between the thermoplastic composition and the dye-based graphic, and
    wherein the thermoplastic composition does not contact the first surface of the substrate.

2. The decorated thermoplastic film of claim 1, wherein the thermoplastic composition, under heat and pressure, forms a miscible and/or adhesive bond with the second surface of the substrate.

3. The decorated thermoplastic film of claim 2, wherein the substrate comprises multiple film layers.

4. The decorated thermoplastic film of claim 3, wherein the multiple film layers comprise transparent layers, opaque layers, or a combination thereof.

5. The decorated thermoplastic film of claim 4, wherein the first surface of the substrate comprises a transparent layer and the second surface of the substrate comprises an opaque layer.

6. The decorated thermoplastic film of claim 1, wherein the substrate comprises a thermoplastic resin suitable for injection molding.

7. The decorated thermoplastic film of claim 6, wherein the thermoplastic resin is a polycarbonate homopolymer, copolycarbonate, acrylonitrile-butadiene-styrene resin (ABS), styrene/acrylonitrile (SAN), polyamide, thermoplastic polyurethane, polymethylmethacrylate (PMMA Acrylic), thermoplastic urethane (TPU), Thermoplastic Elastomer (TPE), polyvinyl fluoride (PVF), poly vinylidine fluoride (PVDF), a blend of different polycarbonates, or a mixture thereof.

8. The decorated thermoplastic film of claim 6, wherein the thermoplastic resin is a polycarbonate resin.

9. The decorated thermoplastic film of claim 6, wherein the thermoplastic resin is poly vinyl fluoride (PVF).

10. The decorated thermoplastic film of claim 1, wherein the first surface of the substrate comprises a film layer comprising poly vinyl fluoride (PVF).

11. The decorated thermoplastic film of claim 1, wherein the first surface of the substrate comprises a film layer comprising poly vinylidine fluoride (PVDF).

12. The decorated thermoplastic film of claim 1, wherein the substrate comprises polycarbonate resin.

13. The decorated thermoplastic film of claim 1, wherein the dye-based graphic comprises a digital inkjet-printed graphic.

14. The decorated thermoplastic film of claim 1, wherein the substrate has a coating overlaying the first surface.

15. A method for making a decorated thermoplastic film, the method comprising:
(i) rendering a dye-based graphic into a substrate, the substrate having a first surface and a second surface located opposite of the first surface,
    wherein the graphic is rendered into the first surface of the substrate;
(ii) placing the substrate in a mold, wherein the first surface of the substrate is positioned to be in contact with the mold; and
(iii) injecting a thermoplastic composition into the mold onto the second surface,
    wherein the second surface of the substrate maintains separation between the thermoplastic composition and the dye-based graphic, and
    wherein the thermoplastic composition does not contact the first surface of the substrate.

16. The method of claim 15, wherein the thermoplastic composition forms a miscible and/or adhesive bond with the second surface of the substrate layers.

17. The method of claim 15, wherein the substrate comprises multiple film layers.

18. The method of claim 17, wherein the multiple film layers comprise transparent layers, opaque layers, or a combination thereof.

19. The method of claim 18, wherein the first surface of the substrate comprises a transparent layer and the second surface of the substrate comprises an opaque layer.

20. A method for making a decorated thermoplastic film, the method comprising:
(i) printing a dye-based graphic onto a surface of transfer paper;
(ii) transferring the dye-based graphic by sublimation into a top layer of a substrate;
(iii) forming the substrate with the dye-based graphic to attain a three-dimension substrate;
(iv) placing the three-dimensional substrate with the dye-based graphic in a mold, wherein the dye-based graphic is in contact with the inside of the mold; and
(v) injecting a thermoplastic composition into the mold,
    wherein the substrate maintains separation between the thermoplastic composition and the top layer of the substrate, and
    wherein the thermoplastic composition does not contact the top layer of the substrate.

* * * * *